HIGH SPEED THERMAL MATRIX PRINTER

Filed June 30, 1961 2 Sheets-Sheet 1

INVENTORS
RICHARD S. SAKURAI
ERNEST E. TRIMBUR II
BY
William R. Nolte
AGENT

Nov. 28, 1967 R. S. SAKURAI ET AL 3,354,817

HIGH SPEED THERMAL MATRIX PRINTER

Filed June 30, 1961 2 Sheets-Sheet 2

INVENTORS.
RICHARD S. SAKURAI
ERNEST E. TRIMBUR II

BY William R. Nolte

AGENT

1

3,354,817
HIGH SPEED THERMAL MATRIX PRINTER

Richard S. Sakurai and Ernest E. Trimbur II, Philadelphia, Pa., assignors to Burroughs Corporation, Detroit, Mich., a corporation of Michigan Filed June 30, 1961, Ser. No. 121,184
9 Claims. (Cl. 101—93)

This invention relates to high speed printing devices and more particularly to high speed printing devices using energy from electrical pulses to mark thermally sensitive recording media in the form of paper or plastic.

There are at the present time many types of printing devices capable of printing out information from computers at a relatively high rate of speed. This information is usually in the form of coded electrical pulses which must be reflected into more permanent forms of intelligence such as by impact printing, by punching perforations in a record, or by deforming or perforating a record medium by the emission of high voltage electrical energy discharges. The latter method of recording is subject to problems involving handling the high voltages per se, the wear on the electrodes due to discharge, and in certain instances strict control of the gaseous chamber in which the electrodes are housed. One means of obviating the above problems is a high speed printing or recording device which will record intelligence upon a recording medium such as thermally sensitive paper or thermoplastic as rapidly as the intelligence is imparted from a source such as a computing machine.

It is an object of the invention, therefore, to provide an improved high speed printer which avoids one or more of the disadvantages of the prior art arrangements.

Another object of the invention is to provide novel means capable of printing or recording intelligence on a record medium as rapidly as the intelligence is imparted from a source such as a computing machine.

Still another object of the invention is to provide novel apparatus of marking a recording medium which is deformable upon impingement of heat energy thereon.

It is another object of the invention to provide high speed line printing apparatus for character-by-character printing wherein each character may be selected and printed in any desired sequence without involving the mechanical displacement of character printing members.

A further object of the invention is to provide printing apparatus wherein aligned matrix printing heads are disposed in a manner for printing a line of text, each head being associated with an independently energizable means for printing position selection.

Briefly, the recording apparatus of this invention includes means in the form of one or more matrix recording heads each capable of producing miniature digital heat sources to graphically mark in symbol or character form a thermally sensitive record medium. Each recording head comprises a plurality of cooperating pairs of electrodes, the electrodes of each pair being electrically connected by means of a high resistive metal element. First circuit means are connected to one electrode of a pair, and second circuit means are connected to the other electrode of each pair. Depending upon the graphic character or symbol to be printed, the first and second circuit means are coincidentally energized thus completing electrical paths between selected electrode pairs. The electrical current running through the electrodes generate heat energy in their respective resistive elements which impinge upon an adjacently disposed thermal sensitive record medium to mark the same.

For a better understanding of the present invention, together with other and further objects thereof, reference is had to the following description taken in connection with the accompanying drawing and its scope will be pointed out in the appended claims.

2

Figure 1:
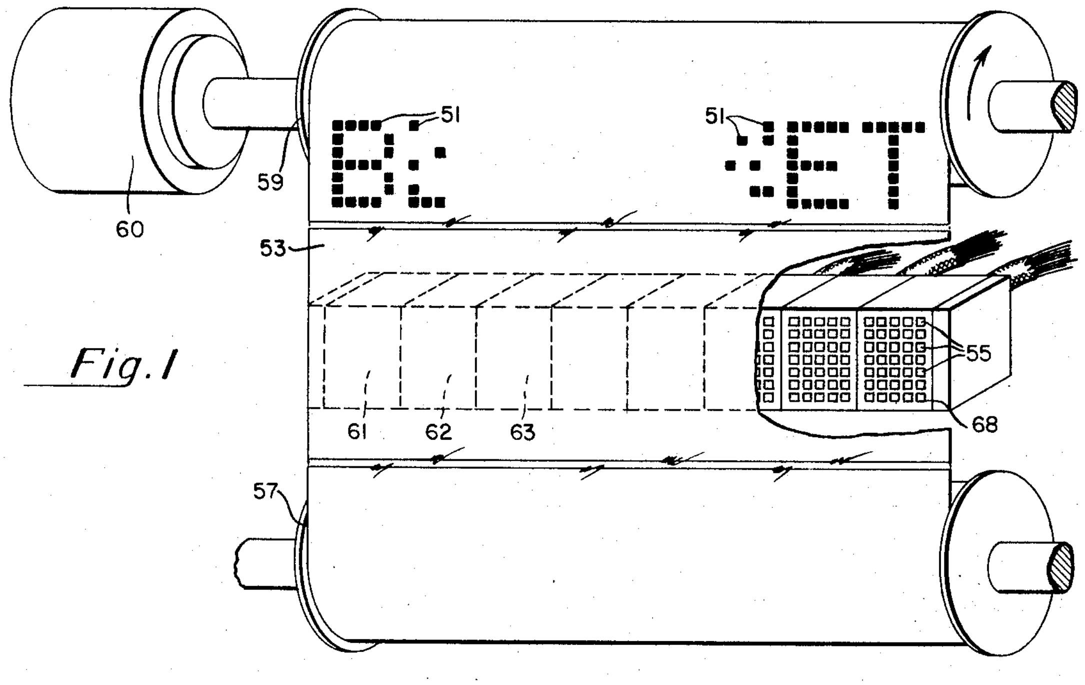
FIG. 1 is a perspective view of a portion of a printer in accordance with the principles of the invention wherein a single row of matrix heads is employed.

Referring now to the drawings, FIG. 1, shows in simplified form a system embodying basic features of the novel thermal printing apparatus which consists of making an appropriate pattern of dots or marks 51 upon a thermal sensitive record medium 53 by means of miniature digital heat sources 55. In this figure there is seen a supply roll 57, a take-up roll 59 between which the thermal record medium, which may be in the form of heat-sensitive paper or plastic, is transported by motor 60. The movement of the printing medium may be either continuous or in steps, its speed being at a rate synchronized with the character rate to produce properly shaped characters.

Figure 3:
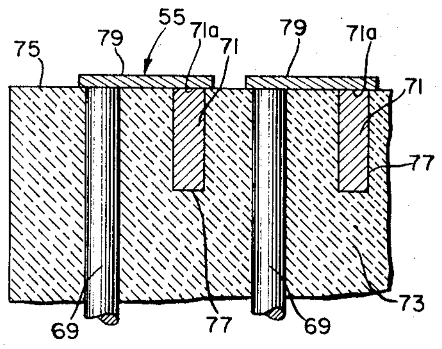
FIG. 3 is a sectional view taken along the line 3—3 of FIG. 2.
Figure 2:
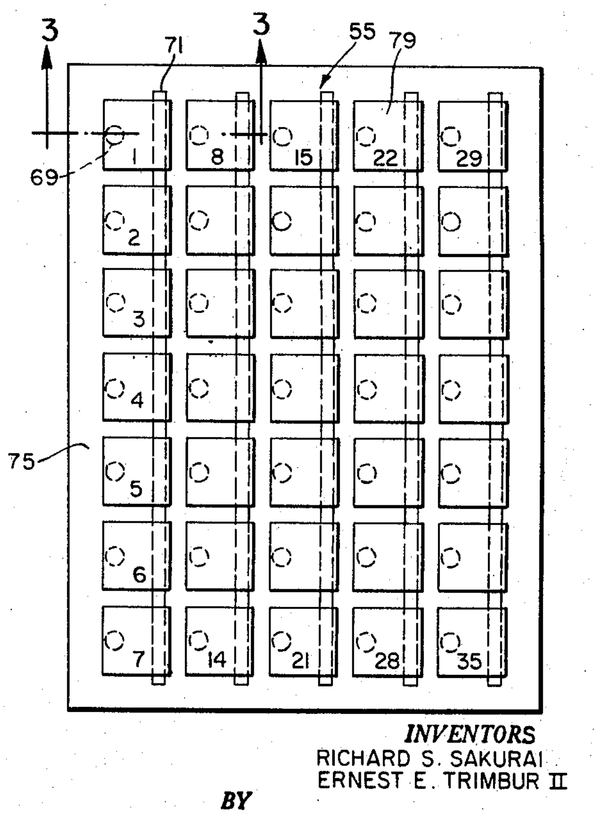
FIG. 2 illustrates an enlarged view of single matrix type head.

In particular a plurality of recording heads 61 and 68 inclusive arranged in a row across the back surface and in closely spaced relationship with the recording medium 53 to print out a line of type thereon. Actual contact with the back surface of the medium is desirable. The miniature digital heat sources 55 of each recording head are constructed in accordance with the invention consist of a plurality of pin electrodes 69 and cooperating bar electrodes 71. The pin electrodes shown in FIGS. 2 and 3 are arrayed in 5 x 7 matrix form flush with the top surface 75 of a moderately high temperature potting compound 73. The bar electrodes 71 are laid along each vertical column of pins, forming grooves 77 in potting compound 73, such that the top surface **71*a* of the bar electrodes are flush with the top surface 75 of the potting compound. A resistive element 79 of high electrical resistance and in the present instance formed of a metal such as Nichrome, is suitably electrically connected to each pin electrode 69 and its cooperating bar electrode 71. The Nichrome or other resistive metal forming the elements, may in one form thereof, be deposited through a mask (not shown in this application) so as to overlay the top surface of each cooperating pair of electrodes 69, 71 respectively, and to be supported in a common plane upon the top surface 75 of the potting material. The electrode elements 69, 71 by contrast with the resistance elements 79** are of relatively low electrical resistance such that when electrical current in the form of low voltage pulses is passed through the cooperating electrode pairs, most of the heat generated thereby will be produced in the Nichrome resistive elements. The heat so generated impinges upon the heat sensitive record medium which is in close contact therewith to mark the same.

Figure 4:
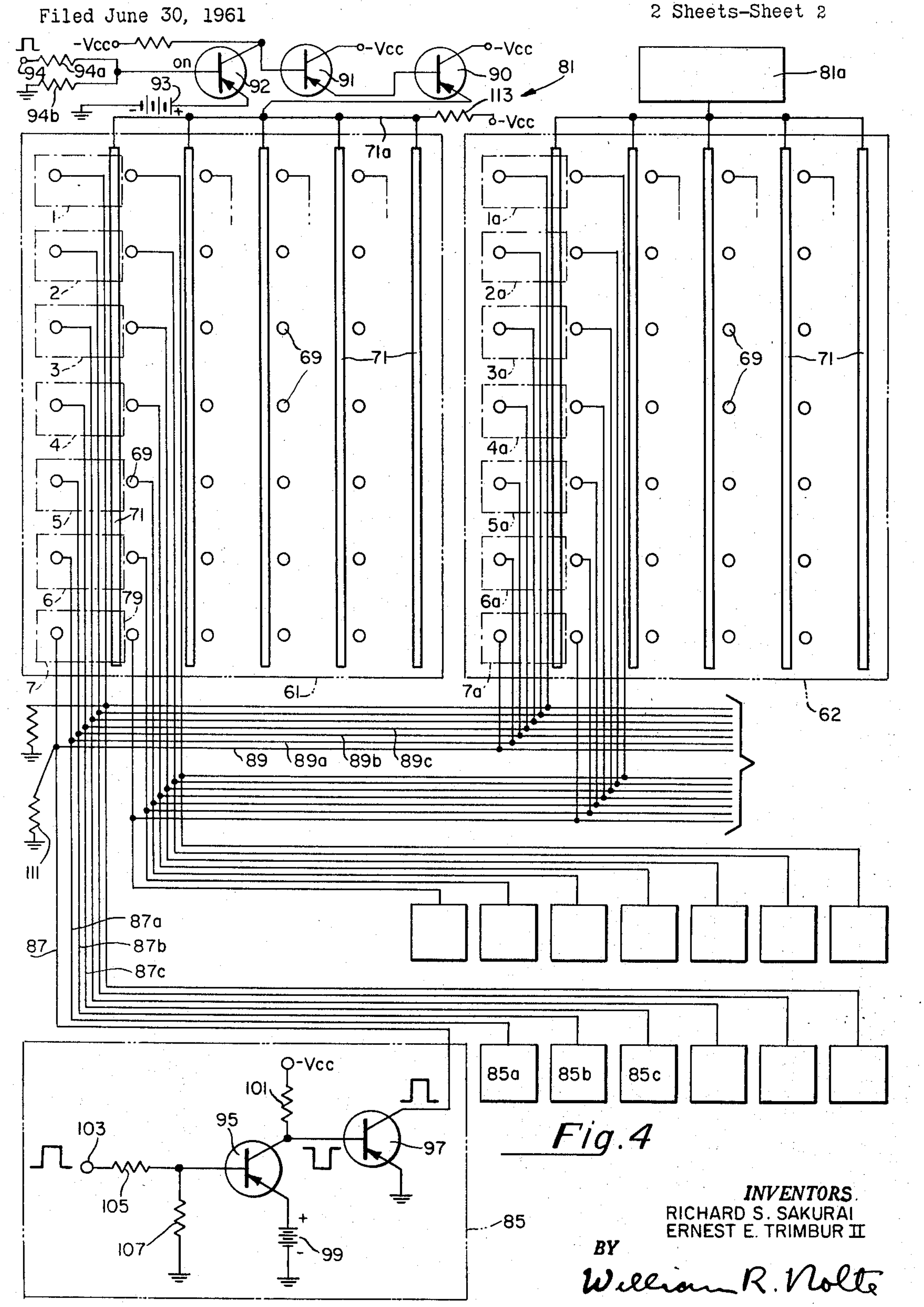
FIG. 4 is a schematic, showing electrical circuitry for operating the recording heads.

Referring now more particularly to FIG. 4 of the drawings, there is shown an electrical schematic associated with the apparatus of the present invention which comprises first circuit means connected with the bar electrodes 71 of each of the recording heads to serially select and make ready a particular head for a printing operation, and second circuit means connected to the pin electrodes of each head and which may be permutably energized coincidentally with said first circuit means to print out a predetermined character at said particular head so selected. While only the two leftmost recording heads 61, 62 are shown in the configuration, it is understood that successive recording heads 65, 66 etc. may be cooperatively interconnected in a manner as hereinafter described. The digital heat sources 79 are disposed in locations 1 through 35 inclusive in head 61 and in like locations **1*a* through 35*a*** inclusive in recording head 64. In order to select the particular head along the printing line at which printing is to occur, for example at head location 61, a first circuit means 81 is provided which is connected in common to all five of the electrode bars 71 contained in that head.

A selected character formation at that particular head 61 is obtained by means of second circuit means 85, 85*a*, 85*b*, etc. individual to each miniature heat source location within the matrix. More specifically it is seen that the circuitry indicated in block form and designated 85 is connected to pin electrode 69 by lead 87. The pin electrodes at locations 6, 5, 4 etc. in the same leftmost column of the recording head are likewise connected to individual circuits 85*a*, 85*b*, 85*c*, identical with circuit 85, by leads 87*a*, 87*b*, 87*c*, respectively. Also, the miniature heat sources designated at locations 7*a*, 6*a*, 5*a*, 4*a*, etc. of heat 62 are connected in parallel to circuits designated 85, 85*a*, 85*b*, 85*c* etc. by leads 89, 89*a*, 89*b*, etc. inclusive. Thus each of the thirty-five miniature heat sources of each matrix head is connected to an individual second circuit means identical with circuit 85.

When it is desired to generate heat at location 7 in matrix head 61 for example, which has been selected for printing, the previously mentioned first circuit indicated generally at 81 is energized. The circuitry 81 comprises three transistors 90, 91 and 92 arranged in the common emitter configuration. The transistor 90 which may be of the type 2N174 is connected with its emitter in common with the bar electrodes 71. The collector is connected to a suitable source of negative potential $V_{cc}$ for example −2 volts. The base of transistor 90 is connected to the emitter of transistor 91 of the type 2N301A which is normally off. The collector is also connected to a suitable source of negative potential $V_{cc}$, for example, minus (−2) volts. The base of transistor 91 is connected to the collector of transistor 92 which is normally on. The transistor 92 which may be of the type 2N526 has its emitter connected to a positive source of potential such as a battery indicated at 93 having a magnitude of plus (+6) volts. The collector thereof is connected to $V_{cc}$ −2 volts. The base of transistor 92 is connected to input terminal 94 through resistor 94*a*. The input terminal is connected with a suitable switching device to provide a source of signal pulses of appropriate timing amplitude and polarity as shown. The base of the transistor is also connected to ground through a resistor 94*b*. Upon application of a positive pulse to the base of transistor 92 between terminal 94 and ground, through resistor 94*a*, transistor 92 is turned off. This allows the collector of transistor 92 to go negative turning on transistors 91, 90 respectively, applying a negative signal to the base of transistor 90. When a negative signal is applied to the base of transistor 90, a conduction will be impending depending upon charges in the other part of the system, namely, the instantaneous electrical conditional of the second circuitry contained in the blocks, indicated at 85, 85*a*, 85*b*, 85*c*, etc. and connected to the pin electrodes 69. The circuitry contained within the block 85 comprises two transistors 95, 97 arranged in the common emitter configuration. The transistor 95 which may be of the 2N526 type, has its emitter connected to a positive source of potential which may be a battery indicated at 99 having a magnitude of +6 volts. The collector thereof is connected through a resistor 101 to a source of collector voltage $-V_{cc}$ which for this particular application has an order of magnitude of −2 volts. The base of transistor 95 is connected to an input terminal 103 through a resistor 105. Input terminal 103 may likewise be connected with a suitable switching device to provide a source of signal pulses of timing amplitude and polarity. The base is also connected to ground through a resistor 107. The collector of transistor 97 is connected by the input terminal lead 87 to pin electrode 69 at location 7.

In operation transistor 95 is normally on, that is, it is conducting from ground through battery 99, through resistor 101 to the −2 volt source to return to ground. The transistor 97 is cut off. Upon application of the positive going pulse, between terminal 103 and ground, the transistor 95 is turned off and a negative going signal appears at the collector thereof and transistor 97 now conducts. At the same time the transistor 90 of circuit 81 shown at the top of FIG. 4 has been energized and the complete electrical path may then be traced from ground through transistor 97, through lead 87, through pin electrode 69, through resistive element 79, through bar electrode 71 and then through the transistor 90 to $-V_{cc}$. It should thus be evident now that each of the circuits indicated symbolically by reference characters 85*a*, 85*b*, 85*c* etc. enable a selection to be made similar to that described above.

It is possible to have some bias which produces a heat source at each pad or resistive element 79 which in itself is insufficient to mark the thermal sensitive recording media. This relaxes somewhat the energy required from the digital heat source. One such form of biasing may be achieved by providing a current leakage path in parallel with all selective transistors such as 90 and 97. Referring for example to lead 87, it is shown that the same is connected to ground via resistance 111. In a similar manner the common bar lead 71*a* which connects bar 71 to transistor 90, also includes a resistor 113, which is connected to the $-V_{cc}$ source. In operation, this allows a leakage current to flow through all resistive elements 79 of all recording heads thus providing a bias heat source which is insufficient to mark alone.

From the above-described circuits it can be seen that by permutably energizing selected ones of said circuits a particular letter or symbol or other graphic images may be printed upon a thermal sensitive record medium so that the same may be visually observed. In applications in which the matrix printing heads are utilized in a line printer, the heads thereof are energized in serial form in the same manner as reading a line of print from left to right. However, for all practical purposes this action is so rapid that to the human observer a line of type at a time is printed almost instantaneously, although the process is a continuing one in discrete steps.

While the preferred embodiment of this invention has been described at this present time, it will be obvious to those skilled in the art that various changes and modifications may be made therein without departing from the invention, and it is therefore the aim in the appended claims to cover all such changes and modifications as fall within the true spirit and scope of the invention.

What is claimed is:

1. In a recording device comprising a plurality of first electrodes, second electrodes adjacent ones of said first electrodes, a plurality of high resistive elements electrically connecting ones of said first electrode with a second electrode to provide marking elements for recording information, said resistive elements lying in a plane transverse to said first electrodes and said second electrode, second and first circuit means connected respectively to said first electrodes and said second electrode, means for selectively energizing certain of said second circuit means, and further means for energizing said first circuit means in time coincidence with the energization of said second circuit means to thereby effect current flow through selected ones of said resistive elements to generate a marking pattern of information.

2. In a recording device comprising a recording head including a plurality of first electrodes disposed in rows and columns, a plurality of second electrodes, one for each column of said first electrodes, a plurality of groups of high resistive elements located on a common surface, each group of resistance elements electrically connecting a column of first electrodes with said second electrode to provide marking elements for recording information, second and first circuit means connected respectively to said first and second electrodes, means for selectively energizing certain of said second circuit means, and further circuit means for energizing at least a single one of said first circuit means in time coincidence with the energization of said second circuit means to thereby effect current flow through selected ones of said resistive elements to generate a marking pattern in outline of symbol information.

3. In a printing device for marking a thermally sensitive record medium, a plurality of columns of electrodes, a plurality of bar electrodes one associated with each column thereof, a plurality of high resistive elements electrically interconnecting the electrodes of each column to its associated bar electrode to provide marking elements for recording information, first circuit means connected to the electrodes in said columns and second circuit means connected to said bar electrodes, and means for simultaneously energizing said first and second circuit means to thereby effect current flow through ones of said resistive elements to generate sufficient heat to obtain a marking pattern in outline of symbol information and to effect current flow through others of said resistive elements in an amount insufficient to mark the record medium.

4. In apparatus for graphically recording upon a thermally sensitive record medium, the combination comprising, a plurality of recording heads, each of said heads including a plurality of resistive elements disposed in a plane in the form of a matrix to constitute marking elements for recording information, a plurality of first electrodes, one connected to each element, correspondingly located first electrodes in each matrix having a common electrical connection, a plurality of second electrodes, each connected to a group of said elements, the second electrodes of each matrix having a common electrical connection, first circuit means associated with each common electrical connection of the first electrodes and second circuit means connected to the common electrical connection of the second electrodes of each matrix, means for selectively energizing certain of said first and second circuit means in timed coincidence to thereby effect a marking current flow through selected ones of said resistance elements of each selectively energized matrix to generate a marking pattern in outline of symbol information and to cause current to flow in other of said resistive elements of said selectively energized matrixes in an amount insufficient to mark said record medium.

5. In apparatus for graphically recording upon a thermally sensitive record medium, the combination comprising, a plurality of recording heads, each of said heads including a matrix of cooperating first and second electrodes, a plurality of resistive elements disposed in a plane and connecting a group of said first electrodes to a second electrode, first means connected to the second electrodes of each matrix, second circuit means connected to homologously situated first electrodes of said recording heads, means for applying a first pulse to energize said first circuit means in at least one recording head, means for applying second pulses to selected ones of said second circuit means simultaneously with said first pulse in accordance with the graphic character to be printed, the coincident energization of said first and second circuit means electrically completing the electrical path between selected first and second electrodes through their respective connecting resistive elements to a current source sufficient to produce thermal energy in the selected resistive elements to form a pattern in accordance with said character to be printed.

6. In a printer for selectively marking a thermally sensitive recording paper, a plurality of printing heads disposed adjacent said paper, each head including an array of electrically conductive pins disposed in rows and columns, an electrically conductive bar disposed adjacent each column of pins, a plurality of pads of high resistive metal each electrically connecting a pin with an adjacent bar to provide marking elements for recording information means of electrically insulating material supporting said array of pins and bars flush with one surface thereof and so that said pads project therefrom in bridging relationship with said pins and bar, first circuit means connected to said pins and second circuit means connected to said bar, and means for selectively energizing said first and second circuit means simultaneously in accordance with a predetermined character to be printed to pass current through predetermined pads in at least one printing head to cause said predetermined pads to emit thermal energy to mark said thermally sensitive recording paper and whereby current is passed through the remaining resistive elements of said at least one printing head in an amount insufficient to print.

7. In a recording device comprising a plurality of first electrodes, a second electrode adjacent said first electrodes, a plurality of high resistive elements electrically connecting each first electrode with said second electrode to provide marking elements for recording information, second and first circuit means connected respectively to said first electrodes and said second electrode, second and first biasing means associated with said second and first circuit means respectively, means for selectively energizing certain of said second circuit means, and further means for energizing said first circuit means in time coincidence with the energization of said second crcuit means to thereby effect current flow through selected ones of said resistive elements to generate a marking pattern of information, said second and first biasing means permitting leakage current to flow through all of said high resistive elements producing a biasing heat source which is insufficient to mark.

8. A printing head for thermally marking a thermally-sensitive record material comprising a substrate member of high resistivity material having at least one plane surface, a plurality of resistive elements selectively positioned upon said plane surface, and a pair of electrical conductors extending through said substrate member for each of said resistive elements whereby the passage of a short-duration electrical pulse through said electrical conductor pairs will produce in the corresponding resistive element a temperature rise of sufficient magnitude to produce a mark on thermally-sensitive record material in cooperative relationship therewith.

9. A printing head for thermally marking a thermally-sensitive record material comprising a substrate member of high resistivity material having at least one plane surface, a plurality of resistive elements selectively positioned upon said plane surface in the form of a matrix of columns and rows, and a pair of electrical conductors supported by said substrate member for each of said resistive elements whereby the passage of a short-duration electrical pulse through said electrical conductor pairs will produce in the corresponding resistive element a temperature rise of sufficient magnitude to produce a mark on thermally-sensitive record material in cooperative relationship therewith.

References Cited

UNITED STATES PATENTS

| | | | |
|---|---|---|---|
| 121,765 | 12/1871 | Eaton | 219—30 |
| 2,033,897 | 3/1936 | Jenkins et al. | 219—29 |
| 2,248,522 | 7/1941 | Conrad | 197—1 X |
| 2,486,985 | 11/1949 | Ruderfer | 101—93 |
| 2,539,874 | 1/1951 | Stockfleth. | |
| 2,715,360 | 8/1955 | Brown | 101—92 |
| 2,898,468 | 8/1959 | McNaney. | |
| 2,919,171 | 12/1959 | Epstein et al. | 346—74 |
| 2,930,847 | 3/1960 | Metzger | 178—23 |
| 2,951,121 | 8/1960 | Conrad | 178—23 |
| 2,957,315 | 10/1960 | Wood. | |

WILLIAM B. PENN, *Primary Examiner.*